United States Patent
Borgmann

(10) Patent No.: US 11,007,877 B2
(45) Date of Patent: May 18, 2021

(54) METHOD FOR OPERATING A MOTOR VEHICLE

(71) Applicant: AUDI AG, Ingolstadt (DE)

(72) Inventor: Jochen Borgmann, Wettstetten (DE)

(73) Assignee: AUDI AG, Ingolstadt (DE)

( * ) Notice: Subject to any disclaimer, the term of this patent is extended or adjusted under 35 U.S.C. 154(b) by 491 days.

(21) Appl. No.: 15/808,521

(22) Filed: Nov. 9, 2017

(65) Prior Publication Data

US 2018/0208078 A1 Jul. 26, 2018

(30) Foreign Application Priority Data

Jan. 23, 2017 (DE) .......................... 102017200978.0

(51) Int. Cl.
*B60L 15/20* (2006.01)
*B60T 8/24* (2006.01)
(Continued)

(52) U.S. Cl.
CPC ................ *B60L 7/10* (2013.01); *B60K 6/00* (2013.01); *B60K 6/52* (2013.01); *B60L 7/18* (2013.01);
(Continued)

(58) Field of Classification Search
CPC ........ B60L 15/2018; B60L 58/12; B60L 7/10; B60L 7/18; B60L 2240/423; B60K 6/00;
(Continued)

(56) References Cited

U.S. PATENT DOCUMENTS

| 5,552,681 A | * | 9/1996 | Suzuki | .................. B60K 6/485 318/139 |
| 6,762,523 B1 | * | 7/2004 | Lisowski | ................. B60K 6/26 192/84.5 |

(Continued)

FOREIGN PATENT DOCUMENTS

| CN | 103732467 A | | 4/2014 |
| CN | 106093628 A | * | 11/2016 |

(Continued)

OTHER PUBLICATIONS

M.K Yoong et al., "Studies of Regenerative Braking in Electric Vehicle," 2010, Publisher: IEEE.*

(Continued)

*Primary Examiner* — Tuan C To
(74) *Attorney, Agent, or Firm* — Maier & Maier, PLLC

(57) ABSTRACT

A method for operating a motor vehicle, which is equipped with a plurality of wheels and with a plurality of electric machines. Each electric machine can be coupled to at least one wheel and be operated in a plurality of operating modes. The respective electric machines perform rotations in a first engine operating mode in a first direction of rotations. Electric energy is converted to mechanical energy. The at least one wheel is rotated in a forward direction, whereby the vehicle is driven with the at least one wheel. The respective electric machines perform rotations in a second generator operating mode in a second direction of rotations, which is opposite to the first direction of rotations, whereby electric energy is converted to mechanical energy.

8 Claims, 1 Drawing Sheet

(51) Int. Cl.
  *B60L 7/18* (2006.01)
  *B60L 7/10* (2006.01)
  *B60K 6/00* (2006.01)
  *B60W 30/18* (2012.01)
  *B60K 6/52* (2007.10)
  *B60W 30/00* (2006.01)

(52) U.S. Cl.
  CPC .......... *B60L 15/2018* (2013.01); *B60T 8/245* (2013.01); *B60W 30/18127* (2013.01); *B60L 2240/423* (2013.01); *B60T 2201/04* (2013.01); *B60T 2230/08* (2013.01); *B60T 2270/60* (2013.01); *B60W 30/00* (2013.01); *Y02T 10/70* (2013.01); *Y02T 10/72* (2013.01)

(58) Field of Classification Search
  CPC ....... B60K 6/52; B60T 8/245; B60T 2201/04; B60T 2230/08; B60T 2270/60; B60W 30/18127; B60W 30/00; Y02T 10/7005; Y02T 10/7044; Y02T 10/705; Y02T 10/7258
  USPC ........................................................... 701/22
  See application file for complete search history.

(56) References Cited

U.S. PATENT DOCUMENTS

| | | | | |
|---|---|---|---|---|
| 6,886,648 B1* | 5/2005 | Hata | .............. | B60L 50/16 180/65.235 |
| 8,981,727 B2* | 3/2015 | Kusch | .............. | B60L 58/26 320/134 |
| 9,136,752 B1* | 9/2015 | Alkhoori | .............. | H02K 7/025 |
| 9,242,565 B2 | 1/2016 | Kleickmann et al. | | |
| 9,481,252 B1 | 11/2016 | Si et al. | | |
| 9,720,410 B2* | 8/2017 | Fairfield | .............. | G05D 1/0044 |
| 9,738,272 B2* | 8/2017 | West | .............. | B60W 20/40 |
| 9,908,423 B2* | 3/2018 | Bell | .............. | B60L 53/12 |
| 10,106,038 B2* | 10/2018 | Jiang | .............. | B60L 58/18 |
| 2003/0163287 A1* | 8/2003 | Vock | .............. | A61B 5/14532 702/187 |
| 2009/0069149 A1* | 3/2009 | Okumura | .............. | B60L 58/20 477/28 |
| 2011/0303497 A1 | 12/2011 | Gaffney et al. | | |
| 2014/0210398 A1* | 7/2014 | Powell | .............. | B60L 11/1811 320/104 |
| 2015/0126328 A1* | 5/2015 | Banker | .............. | B60L 50/16 477/4 |
| 2015/0251657 A1* | 9/2015 | Johri | .............. | B60W 20/14 701/22 |
| 2016/0264077 A1* | 9/2016 | Abousleiman | .............. | B60L 1/02 |
| 2016/0311325 A1* | 10/2016 | Lieu | .............. | B60W 10/24 |
| 2017/0015310 A1* | 1/2017 | Bjorkman | .............. | F02N 11/006 |
| 2017/0259670 A1* | 9/2017 | Kuang | .............. | B60L 7/18 |
| 2018/0043892 A1* | 2/2018 | Maeda | .............. | B60W 10/02 |
| 2018/0126978 A1* | 5/2018 | Jerger | .............. | B60W 30/182 |
| 2018/0141557 A1* | 5/2018 | Nefcy | .............. | B60W 50/0097 |
| 2018/0162373 A1* | 6/2018 | Colavincenzo | .............. | B60L 58/20 |
| 2018/0198401 A1* | 7/2018 | Thongam | .............. | H02M 3/158 |
| 2018/0339698 A1* | 11/2018 | Hock | .............. | B60K 6/448 |
| 2018/0345982 A1* | 12/2018 | Falkhall | .............. | B60W 40/09 |

FOREIGN PATENT DOCUMENTS

| | | | | |
|---|---|---|---|---|
| CN | 106121941 A | * | 11/2016 | |
| CN | 106246264 A | * | 12/2016 | |
| DE | 4446219 A1 | | 6/1996 | |
| DE | 10 2007 056 301 A1 | | 5/2009 | |
| DE | 102010042995 A1 | | 5/2012 | |
| DE | 102011004862 A1 | | 8/2012 | |
| DE | 102012107963 A1 | | 3/2014 | |
| DE | 102013205314 A1 | * | 10/2014 | .......... B60L 15/2009 |
| EP | 2562021 A2 | * | 2/2013 | .............. B60L 50/51 |
| WO | WO-2015195856 A1 | * | 12/2015 | .............. H02J 7/345 |

OTHER PUBLICATIONS

Feng et al., "A Series Regenerative Braking Control Strategy Based on Hybrid-Power," 2012, Publisher: IEEE.*

European Examination Report Article 94 (3) dated Feb. 25, 2019 in corresponding European Application No. 17197205.2; including Partial machine-generated English language translation; 7 pages.

European Search Report dated Mar. 14, 2018, in connection with corresponding EP Application No. 17197205.2 (7 pgs.).

German Search Report dated Sep. 18, 2017 of corresponding German application No. 102017200978.0; 8 pgs.

European Examination Report dated Nov. 7, 2019, in corresponding European Application No. 17 197 205.2 including partial machine-generated English language translation; 9 pages.

Office Action dated Jul. 3, 2020 in corresponding Chinese Application No. 201711351433.1; 17 pages including English-language translation.

Chinese Office Action dated Mar. 1, 2021, in connection with corresponding CN Application No. 201711351433.1 (12 pp., including machine-generated English translation).

* cited by examiner

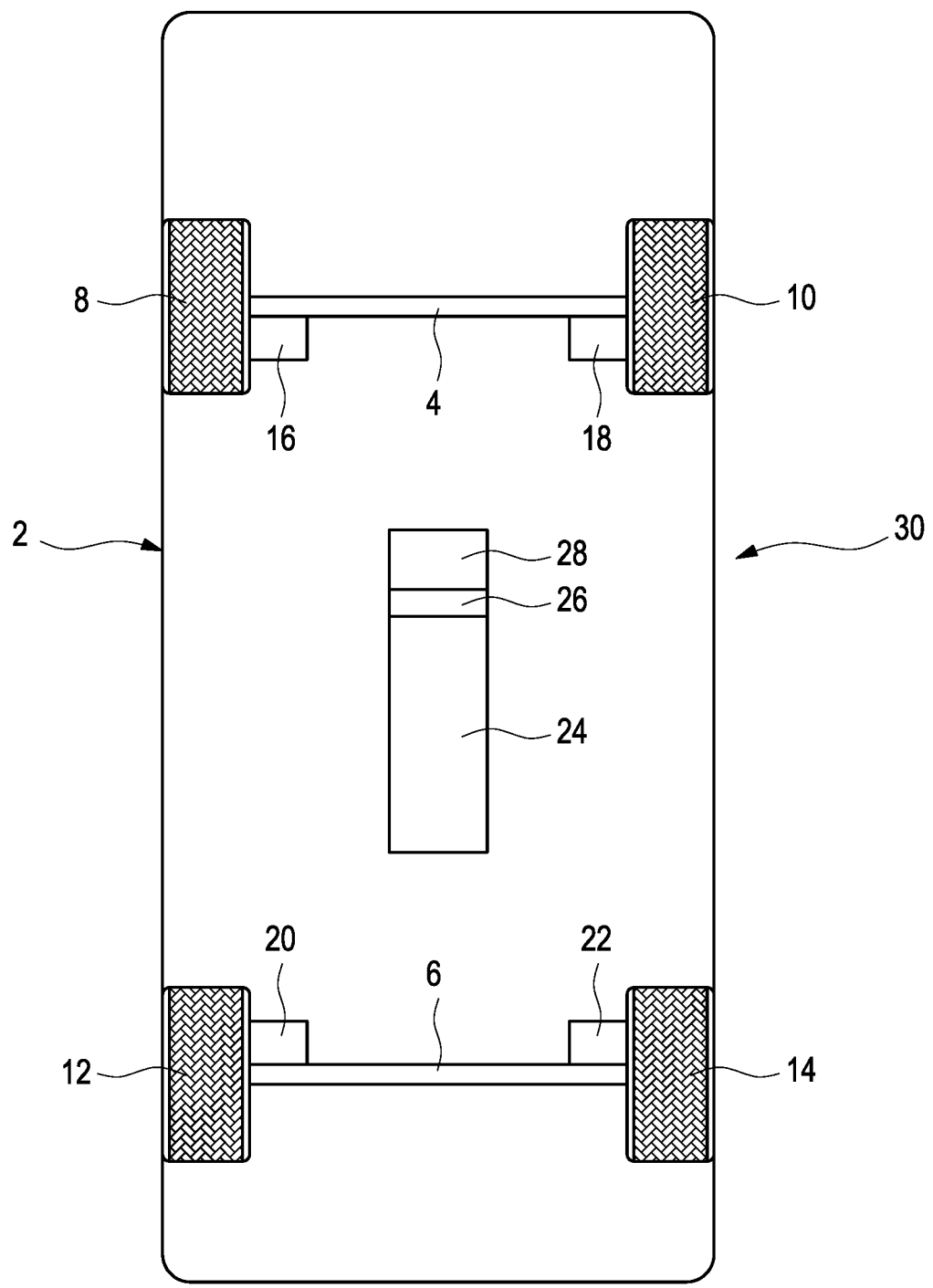

METHOD FOR OPERATING A MOTOR VEHICLE

FIELD

The invention relates to a method for operating a motor vehicle and to a system for operating a motor vehicle.

BACKGROUND

A so-called electric vehicle is provided with at least one electric machine for driving the vehicle, as well as with at least one electric energy storage device, usually a battery which has a high operating voltage, If the at least one electric machine is operated as a motor, the electric energy is converted by the at least one electric storage device to mechanical energy in order to operate the vehicle. However, it is also possible that at least one electric machine is operated as a generator, so that mechanical energy resulting from the movement of the vehicle is converted to electric energy and stored in the at least on electric storage device. In an operating mode in which that the electric machine is operated as a generator, which can also be referred to as recuperation, the traveling movement of the vehicle is being slowed down in this case. If the vehicle is traveling downhill, the mechanical energy can be also converted to electric energy, so that as a result, the brakes of the vehicle can be used sparingly.

However, such a recuperation is possible only if sufficient free capacities are still available for storing electric energy and accordingly, the at least one electric energy storage device is not fully charged prior to the beginning of the downhill travel. If the at least one electric energy storage device has low capacities for storing additional electric energy before the beginning of the downhill travel, conventional brakes of the vehicle must be used, which then must provide all of the required deceleration output. However, this can result in a state in which the brakes become overloaded and/or in that the vehicle requires stronger and heavy and thus also expensive brakes. If the motor vehicle must in addition travel downhill with a trailer, an additional decelerating power must be provided by the conventional brakes.

The document DE 10 2012 107 963 A1 describes an auxiliary drive device for a motor vehicle, which supplements the force of the system by means of an electromotive force initiated by the operator. At the same time, a recuperation can be carried out so that for example a preselected maximum speed can be maintained by controlling the recuperation. This a include the measured wherein an electric machine is controlled for delivering a torque against its direction of rotation when it is not possible to adjust the current driving speed to the preselected maximum speed by using only recuperation.

A control device for a brake system, which is equipped with an electric drive device and/or with a generator device, is described in the publication DE 10 2010 042 995 A1. In this case, the brake system is arranged in a motor vehicle. In addition, it is also possible to apply the drive devices and/or the generator devices against a conventional movement direction of the motor vehicle and opposite to the direction of the movement of the motor vehicle, which can be used on at least one wheel of the motor vehicle.

SUMMARY

Against this background, the object thus was to provide effective braking for a vehicle with electromechanical means.

The method according to the invention for is designed for operating a vehicle which is provided with a plurality of wheels and with a plurality of electric machines, wherein each electric machine is coupled to at least one wheel and can be operated in several operating modes. In this case, the respective electric machines are operating in a first engine operating mode, in which electric energy is converted to mechanical energy, wherein the at least one wheel is rotated in the forward direction or in the direction of forward travel, so that the vehicle is driven with the at least one wheel. In a second engine operating mode, the respective electric machine is operated in a second direction of rotations which is opposite to the first direction of rotations, wherein the electric energy is converted to mechanical energy so that at least one wheel is rotated in the reverse direction, whereby at least one wheel of the vehicle is braked. In addition, a third generator and/or recuperative operating mode is provided for the respective electric machine, wherein the at least one wheel is rotated in the forward direction, so that mechanical energy resulting from the movement of at least one wheel is converted in the third mode, a generator operating mode, into electric energy, so that the vehicle is braked. During this method, at least one first electric machine is operated in the second engine operating mode and at least one second electric machine is operated in the third generator mode, wherein the electric energy which is obtained from at least one second electric machine is converted directly to mechanical energy, and at the same time and/or synchronously, the energy obtained from at least form one first electric machine is converted to mechanical energy.

It is thus possible to supply within the context of the method electric energy that is provided by at least a second electric machine during its operation as a generator, without requiring an intermediate storage in an electric energy storage device to the at least first electric machine, as a rule by means of at least one electric line, by means of which the electric machines are mutually connected to each other, wherein at least one first electric machine converts the newly converted or generated electric energy again into mechanical energy.

Independently thereof, it can be provided that the vehicle is equipped with at least one electric energy storage device in which the electric energy can be stored, which is converted by at least one electric machine in the third generator operating mode from mechanical energy, and which can be extracted from the electric energy that is converted by the at least one electric machine in one of the two possible engine operating mode into mechanical energy.

In an embodiment of the method, at least one first electric machine is operated in the second engine operating mode and the at least one second electric machine is operated in the third generator operating mode, if an amount of electric energy is stored in the at least one energy storage device that is greater than a definable threshold value or definable threshold values. In this manner it is thus possible to brake the vehicle with at least two electric machines, wherein the at least one first electric machine is operated as an engine in the second operating mode with a braking effect, and the at least one second electric machine is operating as a generator in an operating mode with a braking effect, so that the electric machines interchange between them the generated electric energy and covert it again directly into mechanical energy.

Usually, the at least one first electric machine is operated in the second engine operating mode, and the at least one second electric machine is operated in the third generator operating mode when the vehicle needs to be braked.

Alternatively or additionally, the at least one first electric machine is operated in the second engine operating mode and the at least one second electric machine is operated in the third generator operating mode when the vehicle is traveling downhill.

In addition, it is also possible, alternatively or additionally, that a first electric machine is operated in the second engine operating mode and the at least one second electric machine is operated in the third generator operating mode, wherein a torque of the motor vehicle is balanced and distributed among the wheels of the vehicle.

In this connection, the at least one first electric machine, which is operated as a motor in the second operating mode, is coupled to at least one first wheel. In addition, the at least one second electric machine, which is operated as a generator in the third operating mode, is coupled to at least one second wheel. It is thus possible to interchange the torque directly between the at least one second wheel by means of the second electric machine and the at least one first electric machine, and to transfer it to the at least one first wheel. As a rule, the vehicle has a left and a right side with respect to its forward travel direction, on which is arranged at least one wheel. In addition, the vehicle is provided with several axles having at least one wheel on them. Within the context of the method, electric energy can be interchanged between the sides and/or the axles of the vehicle and thus also between the wheels or the electric machines in different positions, i.e. between axles and/or sides of the vehicle, parallel (between the axles), or perpendicularly (between the sides) for the forward direction of travel, but also diagonally.

If the at least one first electric machine is operated in the second engine operating mode and the at least one second electric machine is operating in the third generator operating mode, it is also possible that at least one part of the electric energy, which is required by the at least one first electric machine in the second engine operating mode, will be extracted from the at least one electric energy storage device.

In the event that the at least one first electric machine is operated in the second engine operating mode and the at least one second electric machine is operated in the third generator operating mode, it is alternatively or additionally also possible that at least one part of the electric energy, which is generated by the at least one second electric machine in the third engine operating mode, will be stored in the at least one electric energy storage device.

Therefore, there is also the possibility that one part of the electric energy, which is required by the electric machine in the second operating mode, will be provided by the at least one electric energy storage device, and/or one part of the electric energy will be converted by at least one second electric machine in the third operating mode from mechanical energy for storage in the at least one electric energy storage device.

In this manner, with the additional use of the at least one electric energy storage device, the torque can be interchanged between wheels that are assigned to the electric machines as required and/or as appropriate depending on the situation.

The system according to the invention is designed for operating a vehicle that is provided with a plurality of wheels and a plurality of electric machines, wherein each electric machine is coupled to at least one wheel and can be operated in a plurality of operating modes. In this case, the rotational operations of the respective electric machine can be performed in a first engine operating mode in a first operating direction, wherein electric energy can be converted to mechanical energy, so that at least one wheel can be rotated in the forward direction, or in the direction of forward travel, whereby the motor vehicle can be operated with the at least one wheel. The respective electric machine is additionally able to carry out rotational operations in a second engine operating mode in a second direction of rotations, which is opposite to the first direction of rotations, wherein the electric energy can be converted to mechanical energy, so that at least the at least one wheel can be rotated in the reverse direction or in the reverse direction of the travel, whereby the vehicle can be braked with at least one wheel. A third generator and/or recuperative operating mode s also provided for the respective electric machine, wherein the at least one wheel is rotatable in the forward direction, and wherein mechanical energy resulting from the movement of the at least one wheel can be converted to electric energy in the third generator operating mode, whereby the motor vehicle can be braked. The system also comprises at least one control device, which is designed to cause at least one first electric machine to operate in the second engine operating mode, and to cause at least one second electric machine to operate in the third generator operating mode, whereby the electric energy extracted from at least one second electric machine can be converted from mechanic energy, directly, immediately, at the same time and/or synchronously, from the at least one first electric machine to mechanical energy.

In a possible implementation of the method, the vehicle can be also braked when it is traveling downhill, even in the case when at least one electric energy storage device is fully charged.

The possibility that is inter alia utilized in this case is that at least one electric machine or at least one electric drive can be used for rotations in two rotational directions and thus in two directions, which is not possible for example with a conventional combustion engine that can be operated only in one rotational direction.

When energy reserves are not supposed to be used for braking the vehicle despite the fact that at least one electric machine or high-voltage storage device is fully charged, at least one first electric machine is energized in the second operating mode in a direction that is opposite to the forward direction of the motor vehicle, wherein a magnetic field is set for at least one electric machine which is otherwise used for a reverse driving direction and employed for the direction opposite to the direction of forward travel. Therefore, electric energy can be extracted also for driving the vehicle from the at least one electric storage device if it is for example fully charged. The electric vehicle can thus be as a whole operated also independently of the charging state of the at least one electric storage device, and it can be braked with the at least one electric machine. The result is that, inter alia, further braking of the motor vehicle is made easier and smaller dimensions can be used.

As a rule, the vehicle comprises two drivable axles, which is to say a front axle and a rear axle, wherein at least one electric machine is associated with each axle. In a possible embodiment of the method, electric machines which are associated with both axles are controlled counter to the forward direction, so that all electric machines can use energy obtained from the at least one electric storage device for braking. However, it is also possible to control only one first axle in a direction counter to the forward travel direction, so that only the at least one electric machine which is associated with this first axle consumes electric energy from the at least one electric storage device, while the other two axles are operated with idling operation simultaneously with the first axle.

In a further possible embodiment of the method it is possible that one of the axles is controlled by the at least one electric machine counter to the forward travel direction, while recuperation is carried out by the at least one electric machine which is associated with the other axle. In this case it is possible that while recuperation is carried out by at least one electric machine, the mechanical energy of the associated axle is converted to electric energy, which is at the same time conveyed to the at least one electric machine of the corresponding other axle, wherein the electric energy converted by one electric machine from mechanic energy is immediately converted again to mechanical energy, which works kinetically counter to the direction of the movement of the vehicle in the forward direction.

It is also possible that each axle is associated with two or more electric machines. This may mean that a first electric machine is associated with the left wheel of the respective axle and a second right wheel of the respective axle is associated with the second electric machine. In this case, it is thus possible for the wheels on the second side of the motor vehicle, for example on the right wheels, to be controlled very differently, namely counter to the forward direction and recuperatively. This therefore results in the possibility of distributing the torque and/or providing compensation for the torque, and thus also providing torque vectoring during active electric braking of the motor vehicle, which can be used for example on a long and curvy traveling route downhill.

The method and the related scenarios are implemented in cases that can be described as emergency cases, because depending on the control applied to electric machines, axles and/or wheels, limitations with respect to the control or driving stability may occur, which is why functions that can be realized within the context of the method are also reserved for emergencies. If the driver detects during a trip that the reception of electric energy from at least one energy storage device is limited and/or that a brake is too hot, the vehicle can be braked with at least one electric energy storage device, so that the occupants of the motor vehicle can drive it safely downhill.

The method can be also carried out with vehicles that are provided with more than two axles, wherein at least two of these axles or embodiments of each axles are associated with at least one electric machine. At the same time, the vehicle can be also designed as a trailer.

When operating the vehicle, it is therefore no longer necessarily required to store further electric energy in at least one buffer of an electric energy storage device and thus to control the charging state (SOC, state of charge). Because the motor vehicle is provided with a plurality of electric machines, it is possible to store or reserve in advance a sufficient amount of electric energy in the at least one electric storage device, wherein this at least one electric energy storage device can be also fully charged and the motor vehicle can be nevertheless braked. In addition, the use of a plurality of electric machines in different modes of operation enables distribution of the torque of the motor vehicle, usually between the axles and/or the wheels of the vehicle, which makes it possible to provide improved driving dynamics and driving stability.

Furthermore, when the method is applied such that the charging state of the at least one electric energy storage device is determined as a function of the geographical situation and/or altitude and thus it must be controlled and/or regulated depending on the respective current altitude of the vehicle. The vehicle can therefore be driven, as well as braked, independently of its altitude. This is also the case if all the electric storage devices of the vehicle are already fully charged at the beginning of a trip downhill because the vehicle can be braked even if it is additionally burdened with a trailer.

Since several electric machines are used, wherein each electric machine is associated with at least one wheel and/or at least one axle, it is possible to transfer electric energy directly between different electric machines, without having to store the energy temporarily in the at least one electric energy storage device. In this case, the electric energy, which is converted by the first electric machine from mechanical energy of the vehicle, can be converted again by a second electric machine in the embodiment directly to mechanical energy. The method described here is also suitable for driving wheels which are arranged either in the front or in the rear and/or either on the left or on the right, provided with simultaneous operations of electric machines in different operating modes, and which are to be driven or braked at different power levels, whereby different torques are provided to the wheels and the torque can be in this case appropriately distributed. As a result, the stability of the vehicle as well as the driving dynamics of the vehicle, etc., are supported.

If a brake of the vehicle is overloaded, the vehicle can be still braked by the at least one electric machine, while in contrast to recuperation, electric energy can be also destroyed by conversion to mechanical energy. Therefore, the brakes of the vehicle can be provided with smaller dimensions, so that their mass can be reduced.

Other advantages and embodiments of the invention will become evident from the description and from the attached drawing.

It goes without saying that the features mentioned above and those that are still to be explained below can be used not only in the respective combination shown here, but also in other combinations or in a single setting, without deviating from the scope of the present invention.

The invention is schematically illustrated with embodiments and described in detail with reference to the attached FIGURE.

BRIEF DESCRIPTION OF THE FIGURES

FIG. 1 shows in a schematic representation a motor vehicle which is provided with an embodiment of the system according to the invention for carrying out an embodiment of the method according to the invention.

DETAILED DESCRIPTION OF THE FIGURES

FIG. 1 shows in a schematic representation a motor vehicle 2, which is equipped with a front axle 4 and with a rear axle 6. In this case, on the front axle 4 is provided a left front wheel 8 and a right front wheel 10. On the rear axle 6 is provided a left rear wheel 12 and a right rear wheel 14. In addition, each wheel 8, 10, 12, 14 is associated with an electric machine 16, 18, 20, 22, wherein to the front left wheel 8 is assigned a front left electric machine 16, to the front right wheel 10 is assigned a front right electric machine 18, to the rear left wheel 12 is assigned a rear left electric machine 20, and to the rear right wheel 14 is assigned a rear right electric machine 22. In addition, to the wheels 8, 10, 12, 14 and the electric machines 16, 18, 20, 11, the vehicle 2 comprises as further components at least one electric energy storage device 24, wherein only one such an electric energy storage device 24 is shown here, at least one sensor 26 and at least one control device 28. Monitoring to determine whether the vehicle 2 is traveling downhill, etc., is performed with the at least one sensor 26.

At the same time, at least one of the named components of the vehicle 2 can be also designed as a component of an embodiment of the system 30 according to the invention, and used for carrying out the method according to the method of this invention. The control device 28 is designed to carry out a function, for example an operating mode, or to control and/or regulate with at least one of the component of the vehicle 2, for example one of the named electric engines 16, 18, 20, 22 and/or the system 30, as well as to control at least one step of the embodiment of the method.

In this case, each electric engine 16, 18, 20, 22 can be operated in different operating modes. At the same time, a respective electric machine 16, 18, 20, 22 can be operated as an engine, wherein the at least one electric component of the electric machines 16, 18, 20, 22 provides electric energy, which is converted by respective electric machines 16, 28, 20, 22 to mechanical energy, so that the wheels 8, 10, 12, 14 which are associated with and/or coupled to the respective electric machines 16, 18, 20, 22 are set in motion. In this case it is possible for respective wheels 8, 10, 12, 14 to be operated during the operation of the associated electric machines 16, 18, 20, 22 as an engine either in the first operation mode in a first direction or the forward direction, or to be impacted mechanically in a second operating mode in a second rotational direction or the reverse direction.

At the same time is possible to provide the electric energy of the respective electric machines that is required for this purpose from the at least one electric energy storage device 24 as will be explained later in more detail, namely to provide it from at least one other electric machine 16, 18, 20, 22 which are used as components of the vehicle 2 and/or of the system 30.

In a further operating mode, namely the third operating mode, the respective electric machines 16, 28, 20, 22 are operated as a generator, wherein mechanical energy which results from the rotations of each wheel 8, 10, 12, 14, which are associated with the electric machines 16, 18, 20, 22, is converted to electric energy and it is provided to at least one other component of the vehicle 2 and/or of the system 30, which is to say to an electric energy storage device 24 and/or another electric machine 16, 18, 20, 22.

In the embodiment of the method, at least one first electric machine 16, 18, 20, 22 is operated in the second operating mode, namely an engine operating mode, and at least one second electric machine 16, 18, 20, 22 is operated in the third operating mode, namely a generator operating mode, wherein electric energy from at least one second electric machine 16, 18, 20, 22 is obtained from mechanical energy and converted directly, immediately and at the same time from the at least one first electric machine 16, 18, 20, 22 to mechanical energy.

The invention claimed is:

1. A system for operating a vehicle, comprising:
a plurality of wheels and with a plurality of electric machines,
wherein each electric machine is coupled to at least one wheel and can be operated in a plurality of operating modes;
wherein each respective electric machine can perform rotations in a first direction of rotation in a first operating mode so that electric energy is converted to mechanical energy, wherein the at least one wheel can be rotated in a forward direction, whereby the vehicle can be driven with at least one wheel;
wherein each respective electric machine can perform rotations in a second engine operating mode in a second direction of rotation that is opposite to the first direction of rotation, wherein electric energy can be converted to mechanical energy, whereby the motor vehicle can be braked with at least one wheel;
wherein a third generator operating mode is provided for each respective electric machine, wherein at least one wheel can be rotated in the forward direction, wherein the mechanical energy resulting from the movement of at least one wheel can be converted in the third generator operating mode to electric energy, whereby the motor vehicle can be braked;
wherein the system is provided with at least one control device that is provided in the vehicle to control and regulate the plurality of electric machines, which is designed to cause at least one first electric machine in the second generator operating mode and at least one second electric machine to be operated in the third operating mode; and
wherein electric energy, which can be converted by at least one second electric machine from mechanical energy can be converted directly by at least one first electric machine to mechanical energy.

2. The system of claim 1, wherein the vehicle is equipped with at least one electric energy storage device, in which can be stored electric energy from at least one electric machine that is converted in the third generator operating mode from mechanical energy, and can be extracted from the electric energy which is converted by at least one electric machine in an engine operating mode to mechanical energy.

3. The system of claim 2, wherein the at least one first electric machine is operated in the second engine operating mode and the at least one second electric machine is operated in the third generator operating mode in the case when an amount of electric energy stored at least in the at least one electric storage device is greater than a definable threshold value.

4. The system of claim 1 wherein the at least one first electric machine is operated in the second engine operating mode and the at least one second electric machine is operated in the third generator operating mode when the vehicle is to be braked.

5. The system of claim 1, wherein the at least one first electric machine is operated in the second engine operating mode and the at least one second electric machine is operated in the third generator operating mode when the vehicle is traveling downhill.

6. The system of claim 1, wherein in the case when the at least one first electric machine is operated in the second engine operating mode and the at least one second electric machine is operated in the third generator operating mode, a torque of the motor vehicle is adjusted.

7. The system of claim 2, wherein in the case when at least one first electric machine is operated in the second engine operating mode and the at least one second electric machine is operated in the third engine operating mode, at least one part of the electric energy that is required from the at least one first electric machine in the second engine operating mode is extracted from the at least one electric energy storage device.

8. The system of claim 2, wherein in the case that the at least one first electric machine is operated in the second generator operating mode and the at least one second electric machine is operated in the third generator operating mode, at least one part of the electric energy that is generated by the at least one second electric machine in the third engine operating mode is stored in the at least one electric energy storage device.

\* \* \* \* \*